(12) United States Patent
Moore et al.

(10) Patent No.: US 12,510,145 B2
(45) Date of Patent: *Dec. 30, 2025

(54) BICYCLE FRONT SPROCKET

(71) Applicant: Fox Factory, Inc., Duluth, GA (US)

(72) Inventors: Robert Erik Moore, Burnaby (CA); Douglas Alexander Chalmers, Burnaby (CA)

(73) Assignee: Fox Factory, Inc., Duluth, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/792,313

(22) Filed: Aug. 1, 2024

(65) Prior Publication Data
US 2025/0084920 A1    Mar. 13, 2025

Related U.S. Application Data

(62) Division of application No. 16/440,286, filed on Jun. 13, 2019, now Pat. No. 12,060,928, which is a
(Continued)

(51) Int. Cl.
*F16H 55/06* (2006.01)
*B22D 21/00* (2006.01)
(Continued)

(52) U.S. Cl.
CPC ........... *F16H 55/06* (2013.01); *B22D 21/007* (2013.01); *B22D 25/02* (2013.01); *B28B 1/24* (2013.01);
(Continued)

(58) Field of Classification Search
CPC ........ F16H 55/06; F16H 55/30; B62M 9/105; B62M 9/10; B62M 9/00; B62M 1/36; B28B 1/24; B22D 25/02; B22D 21/007
(Continued)

(56) References Cited

U.S. PATENT DOCUMENTS

| | | |
|---|---|---|
| 2,451,690 A | 10/1948 | Oehler |
| 2,468,011 A | 4/1949 | Hazel |

(Continued)

FOREIGN PATENT DOCUMENTS

| | | |
|---|---|---|
| CA | 2964058 A1 | 10/2017 |
| CN | 1830722 A | 9/2006 |

(Continued)

OTHER PUBLICATIONS

Chinese First Action and Search Report, App No. 201710232829.8, 12 Pages, Dated Feb. 3, 2020.
(Continued)

*Primary Examiner* — Henry Y Liu

(57) ABSTRACT

Methods and apparatus for a composite bicycle front sprocket are disclosed herein. One embodiment discloses a composite bicycle front sprocket assembly having an outer assembly of a first material. The bicycle front sprocket assembly also has a center assembly of a second material. The center assembly is disposed at least partially within the outer assembly. The center assembly is irremovably coupled with the outer assembly. The center assembly is irremovably coupled with the outer assembly without an external fastening device to irremovably couple the center assembly with the outer assembly.

8 Claims, 8 Drawing Sheets

Related U.S. Application Data division of application No. 15/485,009, filed on Apr. 11, 2017, now Pat. No. 11,009,112.

(60) Provisional application No. 62/321,138, filed on Apr. 11, 2016.

(51) Int. Cl.
  *B22D 25/02* (2006.01)
  *B28B 1/24* (2006.01)
  *B62M 1/36* (2013.01)
  *B62M 9/00* (2006.01)
  *B62M 9/10* (2006.01)
  *F16H 55/30* (2006.01)

(52) U.S. Cl.
  CPC ............... *B62M 1/36* (2013.01); *B62M 9/00* (2013.01); *B62M 9/10* (2013.01); *B62M 9/105* (2013.01); *F16H 55/30* (2013.01)

(58) Field of Classification Search
  USPC ......................................................... 474/152
  See application file for complete search history.

(56) References Cited

U.S. PATENT DOCUMENTS

| | | |
|---|---|---|
| 2,793,571 A | 5/1957 | Way et al. |
| 3,168,836 A * | 2/1965 | Militana ................. F16H 55/12 474/902 |
| 3,200,665 A * | 8/1965 | Wells ..................... F16H 55/12 474/161 |
| 3,272,027 A * | 9/1966 | Wayman .................... F16C 3/22 474/112 |
| 3,304,796 A * | 2/1967 | Leege ..................... F16H 55/06 416/241 A |
| 3,371,549 A * | 3/1968 | Schrempp ............... F16H 55/14 74/411 |
| 3,815,439 A | 6/1974 | Tarutani |
| 3,903,754 A | 9/1975 | Morroni |
| 3,905,248 A | 9/1975 | Peyrard |
| 3,987,539 A | 10/1976 | Gravener |
| 4,144,773 A * | 3/1979 | Addicks ................. B62M 9/105 74/DIG. 10 |
| 4,174,642 A | 11/1979 | Martin et al. |
| 4,240,303 A | 12/1980 | Mosley |
| 4,261,214 A | 4/1981 | Watanabe et al. |
| RE30,758 E | 10/1981 | Lang |
| 4,318,310 A | 3/1982 | Segawa |
| 4,331,043 A | 5/1982 | Shimano |
| 4,358,967 A | 11/1982 | Kastan |
| 4,392,841 A | 7/1983 | Juy |
| 4,439,172 A * | 3/1984 | Segawa ................. B62M 9/105 74/447 |
| 4,446,753 A | 5/1984 | Nagano |
| 4,453,924 A * | 6/1984 | Sugino ................... F16H 55/30 474/902 |
| 4,475,894 A | 10/1984 | Sugino |
| 4,545,691 A | 10/1985 | Kastan et al. |
| 4,583,422 A | 4/1986 | Boyd |
| 4,586,914 A | 5/1986 | Nagano |
| 4,594,910 A * | 6/1986 | Nagano ................. B62M 9/105 74/594.1 |
| 4,598,608 A | 7/1986 | Ueno |
| 4,608,878 A | 9/1986 | Shimano |
| 4,722,722 A * | 2/1988 | Rampe .................... F16H 55/48 474/161 |
| 4,867,733 A | 9/1989 | Yamanoi et al. |
| 4,889,521 A | 12/1989 | Nagano |
| 5,003,840 A | 4/1991 | Hinschlager |
| 5,192,248 A | 3/1993 | Nagano |
| 5,192,249 A | 3/1993 | Nagano |
| 5,224,903 A | 7/1993 | Langhof et al. |
| 5,226,469 A | 7/1993 | Matsumura et al. |
| 5,246,402 A | 9/1993 | Romano |
| 5,285,701 A | 2/1994 | Parachinni |
| 5,362,278 A | 11/1994 | Bergles et al. |
| 5,413,534 A | 5/1995 | Nagano |
| 5,451,198 A | 9/1995 | Lancaster |
| 5,738,603 A | 4/1998 | Schmidt et al. |
| 5,830,096 A | 11/1998 | Schmidt et al. |
| 5,852,954 A | 12/1998 | Yamanaka |
| 5,908,364 A | 6/1999 | Tanaka |
| 5,935,033 A | 8/1999 | Tseng et al. |
| 5,947,852 A * | 9/1999 | Moretz .................. F16H 55/12 474/160 |
| 5,984,817 A | 11/1999 | Schulz |
| 6,007,442 A | 12/1999 | Schmidt |
| 6,013,001 A | 1/2000 | Miyoshi |
| 6,022,284 A | 2/2000 | Bartolozzi et al. |
| 6,102,821 A | 8/2000 | Nakamura |
| 6,202,506 B1 | 3/2001 | Storck et al. |
| 6,203,462 B1 | 3/2001 | Takamori |
| 6,564,675 B1 | 5/2003 | Jiang |
| 6,572,500 B2 | 6/2003 | Tetsuka |
| 6,656,072 B2 | 12/2003 | Sugita et al. |
| 6,666,786 B2 | 12/2003 | Yahata |
| 6,755,095 B2 | 6/2004 | Yamanaka |
| 6,860,171 B1 | 3/2005 | Nanko et al. |
| 7,080,574 B2 | 7/2006 | Chang |
| 7,263,914 B2 | 9/2007 | Ording et al. |
| 7,267,030 B2 | 9/2007 | French |
| 7,462,120 B1 | 12/2008 | Thompson |
| 7,503,864 B2 | 3/2009 | Nonoshita et al. |
| 7,530,290 B2 | 5/2009 | Lin |
| 7,610,832 B2 | 11/2009 | Guiseppe et al. |
| 7,686,721 B2 | 3/2010 | Tabe et al. |
| 7,699,733 B2 * | 4/2010 | Sakura .................. F16H 55/30 474/161 |
| 7,713,156 B2 * | 5/2010 | Sakura .................. F16H 55/30 474/161 |
| 7,753,815 B2 | 7/2010 | Saifuddin et al. |
| 7,824,287 B2 * | 11/2010 | Nonoshita ............... B62M 9/10 474/160 |
| 7,850,564 B2 * | 12/2010 | Nonoshita .............. B62M 9/105 474/152 |
| 7,883,437 B2 | 2/2011 | Braedt |
| 7,942,771 B2 | 5/2011 | Kamada |
| 7,967,709 B2 * | 6/2011 | Emura ................... B62M 9/105 474/160 |
| 8,025,304 B2 | 9/2011 | Smith |
| 8,057,338 B2 | 11/2011 | Kamada |
| 8,070,632 B2 * | 12/2011 | Yuan ....................... F16H 55/14 74/411 |
| 8,096,908 B2 | 1/2012 | Oishi et al. |
| 8,226,511 B2 | 7/2012 | Kamada |
| 8,298,104 B2 | 10/2012 | Sakura |
| 8,479,610 B2 * | 7/2013 | Valle ........................ B62M 3/00 74/594.2 |
| 8,550,944 B2 | 10/2013 | Esquibel |
| 8,573,093 B2 | 11/2013 | Valle et al. |
| 8,616,084 B2 | 12/2013 | Meggiolan |
| 8,820,192 B2 | 9/2014 | Staples et al. |
| 8,882,619 B2 | 11/2014 | Braedt |
| 8,888,631 B2 | 11/2014 | Morita |
| 9,016,169 B2 | 4/2015 | Sugimoto et al. |
| 9,033,835 B2 * | 5/2015 | Blank ....................... B62M 9/10 474/152 |
| 9,302,733 B2 | 4/2016 | Schlanger |
| 9,302,736 B2 * | 4/2016 | Iwai ......................... B62M 9/10 |
| 9,308,967 B2 | 4/2016 | Braedt |
| 9,328,814 B2 | 5/2016 | Wesling et al. |
| 9,415,835 B2 * | 8/2016 | Tokuyama ............... B62M 9/12 |
| 9,440,706 B2 * | 9/2016 | Iwai ....................... B62M 9/105 |
| 9,463,844 B2 | 10/2016 | Fukunaga |
| 9,493,211 B2 | 11/2016 | Reiter et al. |
| 9,540,070 B2 | 1/2017 | Watarai et al. |
| 9,580,144 B2 | 2/2017 | Bernardele |
| 9,631,714 B2 | 4/2017 | Watarai et al. |
| 9,677,658 B2 | 6/2017 | Wickliffe |
| 9,719,590 B2 | 8/2017 | Reiter et al. |
| 9,725,133 B2 | 8/2017 | Staples et al. |

(56) References Cited

U.S. PATENT DOCUMENTS

| | | | |
|---|---|---|---|
| 9,791,033 B2 | 10/2017 | Wickliffe et al. | |
| 9,869,382 B2 | 1/2018 | Wesling et al. | |
| 9,914,502 B2 | 3/2018 | Wu | |
| 9,919,763 B2* | 3/2018 | Iwai | B62M 9/10 |
| 9,926,038 B2 | 3/2018 | Fukunaga et al. | |
| 9,932,090 B2 | 4/2018 | Yoshida et al. | |
| 9,944,351 B2 | 4/2018 | Braun et al. | |
| 9,963,196 B2 | 5/2018 | Sugimoto | |
| 9,994,285 B2 | 6/2018 | Tokuyama et al. | |
| 10,040,510 B2 | 8/2018 | Sugimoto et al. | |
| 10,053,186 B2 | 8/2018 | Braedt et al. | |
| 10,059,400 B2 | 8/2018 | Tokuyama et al. | |
| 10,155,566 B2 | 12/2018 | Sugimoto | |
| 10,221,887 B2 | 3/2019 | Dubois et al. | |
| 10,358,186 B2 | 7/2019 | Sugimoto | |
| 10,359,106 B2 | 7/2019 | Akanishi | |
| 10,359,107 B2 | 7/2019 | Young | |
| 10,377,445 B2 | 8/2019 | Hirose et al. | |
| 10,407,127 B2 | 9/2019 | Sugimoto | |
| 10,443,685 B2 | 10/2019 | Reiter | |
| 10,507,888 B2 | 12/2019 | Sugimoto | |
| 10,550,925 B2 | 2/2020 | Akanishi | |
| 10,562,589 B2 | 2/2020 | Sugimoto et al. | |
| 10,578,201 B2 | 3/2020 | Reiter et al. | |
| 10,800,482 B2 | 10/2020 | Staples et al. | |
| 10,864,963 B2 | 12/2020 | Staples et al. | |
| 10,994,804 B2 | 5/2021 | Sugimoto | |
| 11,014,628 B2 | 5/2021 | Choltco-Devlin et al. | |
| 11,130,546 B2 | 9/2021 | Staples et al. | |
| 11,505,277 B1 | 11/2022 | Yamanaka | |
| 2002/0086753 A1* | 7/2002 | Yahata | B62M 9/105 |
| | | | 474/160 |
| 2003/0097900 A1 | 5/2003 | Yamanaka | |
| 2003/0199351 A1* | 10/2003 | Nichols | B62M 9/10 |
| | | | 474/95 |
| 2004/0070166 A1* | 4/2004 | Valle | B62M 9/10 |
| | | | 280/260 |
| 2004/0092352 A1* | 5/2004 | Chiang | B62M 9/10 |
| | | | 474/160 |
| 2004/0200314 A1 | 10/2004 | Hermansen et al. | |
| 2004/0204274 A1 | 10/2004 | Young | |
| 2005/0009656 A1* | 1/2005 | Preis | F16H 55/30 |
| | | | 474/155 |
| 2005/0014590 A1 | 1/2005 | Wen | |
| 2005/0032596 A1* | 2/2005 | Nonoshita | B62K 19/16 |
| | | | 474/178 |
| 2005/0039570 A1 | 2/2005 | Nanko et al. | |
| 2005/0072264 A1 | 4/2005 | Yamanaka | |
| 2005/0081678 A1 | 4/2005 | Smith | |
| 2005/0090349 A1 | 4/2005 | Lee | |
| 2005/0199092 A1 | 9/2005 | Feltrin et al. | |
| 2005/0233850 A1* | 10/2005 | Andel | B62M 9/00 |
| | | | 474/202 |
| 2005/0282671 A1 | 12/2005 | Emura et al. | |
| 2005/0282672 A1* | 12/2005 | Nonoshita | B62M 9/105 |
| | | | 474/174 |
| 2006/0205549 A1 | 9/2006 | Nonoshita et al. | |
| 2006/0210734 A1 | 9/2006 | Lin | |
| 2006/0288819 A1 | 12/2006 | Dal et al. | |
| 2007/0034043 A1 | 2/2007 | Feltrin | |
| 2007/0049437 A1 | 3/2007 | Wickliffe | |
| 2007/0054768 A1 | 3/2007 | Miyazawa | |
| 2007/0111833 A1 | 5/2007 | Young | |
| 2007/0129193 A1* | 6/2007 | Nonoshita | B62M 9/10 |
| | | | 474/160 |
| 2007/0137425 A1 | 6/2007 | Dal et al. | |
| 2007/0173364 A1* | 7/2007 | Renshaw | B62M 9/00 |
| | | | 474/160 |
| 2007/0186718 A1 | 8/2007 | Chiang | |
| 2007/0199403 A1 | 8/2007 | Ciavatta et al. | |
| 2007/0227293 A1 | 10/2007 | Valle | |
| 2007/0227294 A1 | 10/2007 | Valle | |
| 2007/0265122 A1* | 11/2007 | Emura | B62M 9/105 |
| | | | 474/152 |
| 2007/0270261 A1 | 11/2007 | Sakura et al. | |
| 2007/0283781 A1 | 12/2007 | Meggiolan | |
| 2008/0028887 A1* | 2/2008 | Valle | B62M 9/105 |
| | | | 74/594.1 |
| 2008/0120845 A1 | 5/2008 | Hama | |
| 2008/0176691 A1* | 7/2008 | Saifuddin | B62M 9/105 |
| | | | 474/144 |
| 2008/0202284 A1* | 8/2008 | Valle | B62M 3/00 |
| | | | 74/594.1 |
| 2008/0207369 A1 | 8/2008 | Bouchez | |
| 2008/0272572 A1 | 11/2008 | Tsai | |
| 2008/0314193 A1* | 12/2008 | Meggiolan | B62M 3/00 |
| | | | 74/594.1 |
| 2009/0042681 A1* | 2/2009 | Dal Pra' | B62M 9/10 |
| | | | 474/160 |
| 2009/0042682 A1* | 2/2009 | Dal Pra' | F16H 55/30 |
| | | | 474/160 |
| 2009/0105024 A1 | 4/2009 | Sakura et al. | |
| 2009/0236777 A1 | 9/2009 | Chiang | |
| 2009/0243160 A1 | 10/2009 | Chiang | |
| 2009/0247337 A1 | 10/2009 | Sakura et al. | |
| 2010/0064845 A1 | 3/2010 | French | |
| 2010/0093494 A1 | 4/2010 | Smith | |
| 2010/0326233 A1 | 12/2010 | Schlanger | |
| 2011/0126666 A1 | 6/2011 | McAinsh | |
| 2011/0167943 A1 | 7/2011 | Lermen et al. | |
| 2011/0251008 A1 | 10/2011 | Schmitz et al. | |
| 2011/0319209 A1 | 12/2011 | Huang et al. | |
| 2012/0172165 A1 | 7/2012 | Schroedl | |
| 2013/0011215 A1 | 1/2013 | Wells | |
| 2013/0087013 A1* | 4/2013 | Sugimoto | B62M 9/105 |
| | | | 74/594.2 |
| 2013/0139642 A1 | 6/2013 | Reiter et al. | |
| 2013/0184110 A1* | 7/2013 | Reiter | F16H 55/303 |
| | | | 474/152 |
| 2014/0335987 A1 | 11/2014 | Iwai et al. | |
| 2015/0082939 A1 | 3/2015 | Meyer et al. | |
| 2015/0152231 A1* | 6/2015 | Ohki | C08J 5/04 |
| | | | 524/496 |
| 2015/0175241 A1 | 6/2015 | Malloy | |
| 2015/0176692 A1 | 6/2015 | Roh | |
| 2015/0198231 A1 | 7/2015 | Emura | |
| 2015/0210352 A1 | 7/2015 | Sugimoto | |
| 2015/0210353 A1* | 7/2015 | Tokuyama | B62M 9/12 |
| | | | 474/160 |
| 2015/0211623 A1* | 7/2015 | Inui | B23K 15/04 |
| | | | 219/121.64 |
| 2015/0217834 A1* | 8/2015 | Iwai | B62M 9/10 |
| | | | 474/152 |
| 2015/0337943 A1 | 11/2015 | Sugimoto | |
| 2015/0360749 A1* | 12/2015 | Iwai | F16H 55/30 |
| | | | 474/158 |
| 2015/0362057 A1 | 12/2015 | Wesling et al. | |
| 2016/0114859 A1 | 4/2016 | Tsai et al. | |
| 2016/0272279 A1 | 9/2016 | Yoshida et al. | |
| 2017/0029066 A1 | 2/2017 | Fukunaga et al. | |
| 2017/0146109 A1 | 5/2017 | Reiter et al. | |
| 2017/0174288 A1 | 6/2017 | Wu | |
| 2017/0183060 A1 | 6/2017 | Braedt | |
| 2017/0234418 A1 | 8/2017 | Barefoot et al. | |
| 2017/0247081 A1 | 8/2017 | Sugimoto | |
| 2017/0274960 A1 | 9/2017 | Dubois et al. | |
| 2017/0292598 A1 | 10/2017 | Moore et al. | |
| 2018/0037296 A1 | 2/2018 | Hamamoto | |
| 2018/0043203 A1 | 2/2018 | Seol | |
| 2018/0057106 A1 | 3/2018 | Iwai et al. | |
| 2018/0079467 A1 | 3/2018 | Hirose et al. | |
| 2018/0127057 A1 | 5/2018 | Sugimoto | |
| 2018/0134340 A1 | 5/2018 | Emura | |
| 2018/0231060 A1 | 8/2018 | Milanesio et al. | |
| 2018/0347680 A1 | 12/2018 | Akanishi | |
| 2018/0362113 A1 | 12/2018 | Day | |
| 2019/0017586 A1 | 1/2019 | Sugimoto | |
| 2019/0085899 A1 | 3/2019 | Bernardele | |
| 2019/0152558 A1 | 5/2019 | Staples et al. | |
| 2019/0185108 A1 | 6/2019 | Bush et al. | |
| 2019/0210677 A1 | 7/2019 | O'Reilly | |
| 2020/0200253 A1 | 6/2020 | Klawer et al. | |

(56) References Cited

U.S. PATENT DOCUMENTS

| | | |
|---|---|---|
| 2020/0256446 A1 | 8/2020 | Klawer et al. |
| 2021/0094652 A1 | 4/2021 | Staples et al. |
| 2023/0111794 A1 | 4/2023 | Lee et al. |

FOREIGN PATENT DOCUMENTS

| | | |
|---|---|---|
| CN | 200999089 Y | 1/2008 |
| CN | 101224782 A | 7/2008 |
| CN | 103133637 A | 6/2013 |
| CN | 107380340 A | 11/2017 |
| DE | 3130258 A1 | 6/1982 |
| DE | 3531030 A1 | 3/1987 |
| DE | 19751879 A1 | 5/1999 |
| DE | 19954432 A1 | 5/2001 |
| DE | 20218755 U1 | 2/2003 |
| DE | 102015005673 A1 | 11/2015 |
| DE | 202017107695 U1 | 3/2018 |
| EP | 0144984 B1 | 4/1989 |
| EP | 0538780 A1 | 4/1993 |
| EP | 1270393 A1 | 1/2003 |
| EP | 1281609 A2 | 2/2003 |
| EP | 1352825 A1 | 10/2003 |
| EP | 1426282 A2 | 6/2004 |
| EP | 1493654 A1 | 1/2005 |
| EP | 1619417 A2 | 1/2006 |
| EP | 1884460 A2 | 2/2008 |
| EP | 1884461 A2 | 2/2008 |
| EP | 2423091 A1 | 2/2012 |
| ES | 2600778 A1 | 2/2017 |
| FR | 904975 A | 11/1945 |
| FR | 946276 A | 5/1949 |
| FR | 2501615 B1 | 4/1986 |
| GB | 2005363 B | 6/1982 |
| JP | H10181662 A | 7/1998 |
| JP | 2005053410 A | 3/2005 |
| TW | 200821216 A | 5/2008 |
| TW | 201530021 A | 8/2015 |
| WO | 2007147909 A1 | 12/2007 |
| WO | 2010136135 A1 | 12/2010 |

OTHER PUBLICATIONS

Chinese Fourth Action and Search Report, App No. 2020011439469.7, 24 Pages, Dated Feb. 20, 2023.
Chinese Second Action and Search Report, App No. 2020011439469.7, 16 Pages, Dated Mar. 8, 2022.
Chinese Third Action and Search Report, App No. 2020011439469.7, 7 Pages, Dated Aug. 18, 2022.
European Examination Report, European Patent Application No. 17166123.4, 10 Pages, Dated Mar. 18, 2020.
Google Translation of Decision of Rejection for TW Appl. No. 106112061, Feb. 26, 2018 (Year: 2018).
Google Translation of Rejection for TW Appl. No. 106112061, Jul. 30, 2018 (Year: 2018).
Inverted trapezoid—Google Search, Oct. 4, 2019, (Year: 2019).
Machine Translation of Chinese First Action and Search Report, Appl. No. 201710232829.8, Feb. 3, 2020 (Year: 2020).
Proximate definition, Dictionary.com, Sep. 28, 2022 (Year: 2022).
European Search Report, European Patent Application No. 17166123.4, Oct. 5, 2017, 9 Pages.
Decision of Rejection for TW Application No. 106112061 pp. 8, Feb. 26, 2018.
Decision of Rejection for TW Application No. 106112061 pp. 10, Jul. 30, 2018.
Tang, et al., "Guide for Designers of Plastic Articles", Sep. 30, 1993, p. 175.

* cited by examiner

BICYCLE FRONT SPROCKET

CROSS REFERENCE

This application is a divisional of and claims the benefit of and claims priority to U.S. patent application Ser. No. 16/440,286, filed on Jun. 13, 2019, entitled "BICYCLE FRONT SPROCKET" by Robert Erik Moore et al., assigned to the assignee of the present application, and is hereby incorporated by reference in its entirety.

The application Ser. No. 16/440,286 is a divisional of and claims the benefit of and claims priority to U.S. patent application Ser. No. 15/485,009, filed on Apr. 11, 2017, now U.S. Issued U.S. Pat. No. 11,009,112, entitled "BICYCLE FRONT SPROCKET" by Robert Erik Moore et al., assigned to the assignee of the present application, and is hereby incorporated by reference in its entirety.

The application Ser. No. 15/485,009 claims priority to and benefit of U.S. Provisional Patent Application No. 62/321,138 filed on Apr. 11, 2016, entitled "Composite Chain Ring" by Robert Erik Moore and assigned to the assignee of the present application, the disclosure of which is hereby incorporated herein by reference in its entirety.

FIELD OF THE INVENTION

Embodiments of the invention generally relate to a front sprocket assembly for a chain driven vehicle.

BACKGROUND

Traditional bicycle front sprocket structures are often made from metals, such as aluminum. Moreover, it is presently a subtractive process to make them. For example, the metal is machined, punched out, stamped, and the like.

The traditional bicycle front sprocket is also a relatively flat-structure. In other words, the current front sprocket is like a plate or disc, e.g., a 2-dimenional structure, which results in it having low lateral stiffness. In a bicycle, such as a mountain bike that has a large number of gears in the rear, there can be a significant amount of cross-chaining. E.g., the angle of the chain changes as the different rear gears are selected. As the chain moves to the peripheral gears on the rear, there can be an increasing component of lateral pull on the front sprocket which can deleteriously affect the traditional front sprocket, resulting in a loss of drive efficiency and potential for mechanical issues.

BRIEF DESCRIPTION OF THE DRAWINGS

Aspects of the present invention are illustrated by way of example, and not by way of limitation, in the accompanying drawings, wherein.

The drawings referred to in this description should be understood as not being drawn to scale except if specifically noted.

DESCRIPTION OF EMBODIMENTS

The detailed description set forth below in connection with the appended drawings is intended as a description of various embodiments of the present invention and is not intended to represent the only embodiments in which the present invention is to be practiced. Each embodiment described in this disclosure is provided merely as an example or illustration of the present invention, and should not necessarily be construed as preferred or advantageous over other embodiments. In some instances, well known methods, procedures, and objects have not been described in detail as not to unnecessarily obscure aspects of the present disclosure.

In one embodiment of the front sprocket assembly described herein achieves a more integrated aesthetic with composite crank arms. Additionally, embodiments create a front sprocket assembly which is lighter than all-aluminum front sprocket. Further the bicycle front sprocket assembly is able to achieve the above accomplishments while still meeting or exceeding conventional strength and stiffness criteria for front sprockets. Also, the disclosed front sprocket assembly can be built with a lower cost than is found in many conventional front sprockets. The lower costs include a material savings provided by a process that reduces material waste when compared to a traditional manufacturing process.

Figure 1:
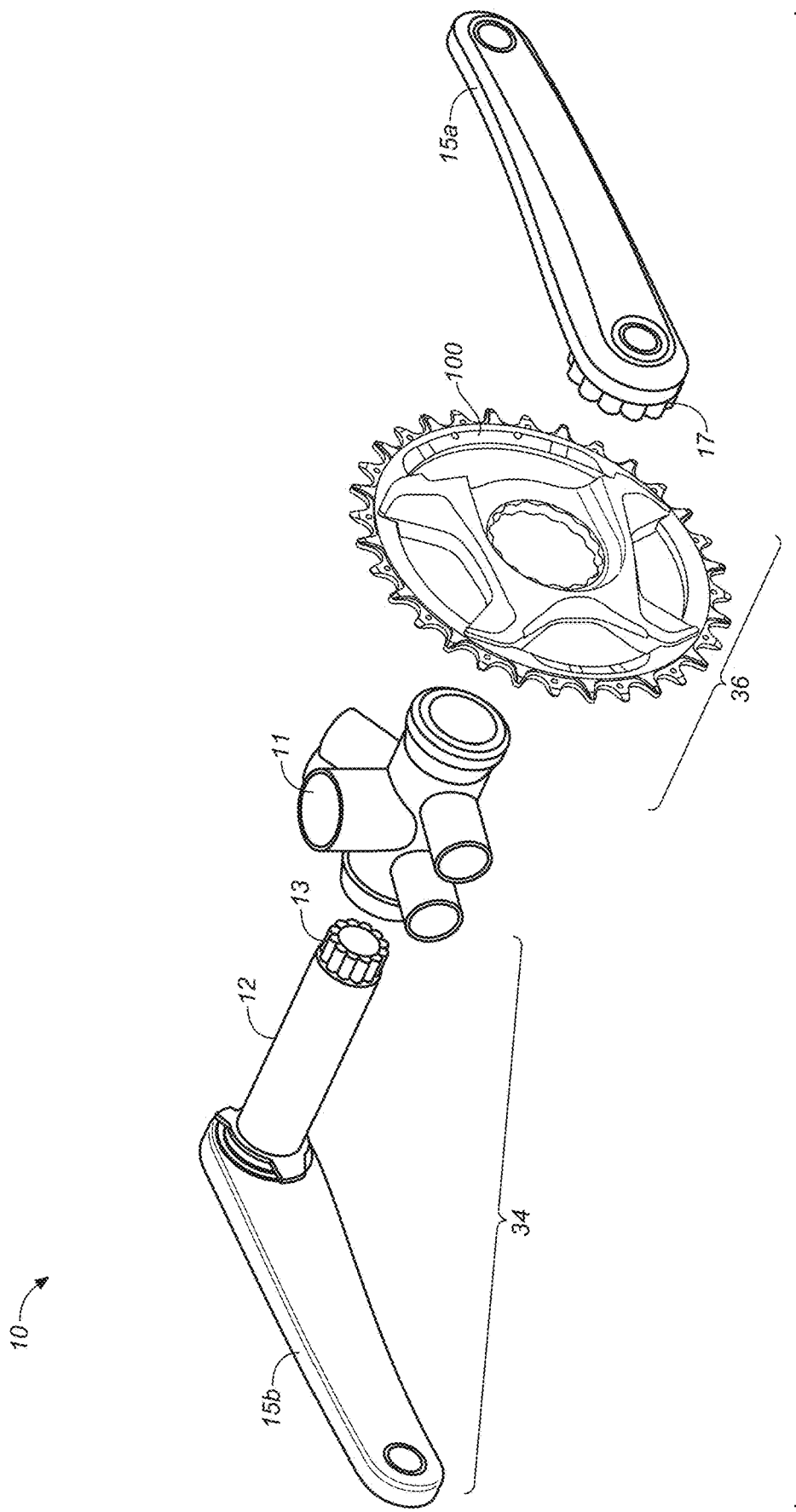
FIG. 1 is an exploded view of a crack assembly, in accordance with an embodiment.

FIG. 1 is an exploded view of a crank assembly 10, in accordance with an embodiment. In one embodiment, crank assembly 10 is shown in conjunction with bicycle frame and bottom bracket portion 11 where it is mounted. Crank assembly 10 includes a left hand non drive crank assembly 34 which includes a left hand crank arm 15b and a spindle 12. Crank assembly 10 also includes a right hand drive side crank assembly 36 which includes a right hand drive side crank arm 15a and a front sprocket assembly 100. In one embodiment, spindle 12 includes a spindle interface 13.

Figure 2:
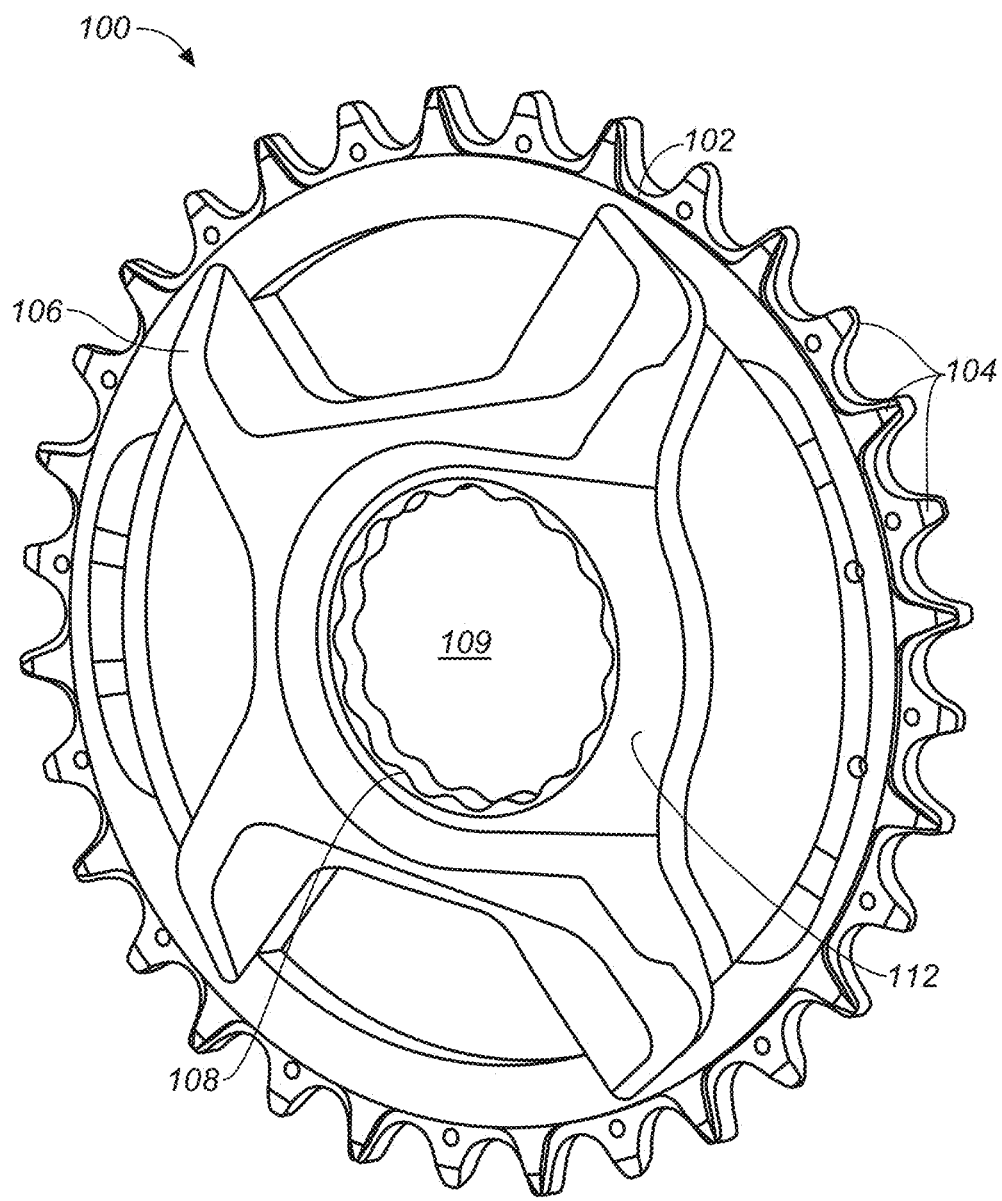
FIG. 2 is a diagram of a bicycle front sprocket assembly, in accordance with an embodiment.

During assembly, right hand drive side crank arm 15a has an assembly interface 17 that will couple with front sprocket assembly 100. Front sprocket assembly interface 17 will couple with opening 109 of front sprocket assembly 100 (as shown in FIG. 2) to fixedly couple front sprocket assembly 100 with right hand drive side crank arm 15a thereby forming the right hand drive side crank assembly 36. In one embodiment, after front sprocket assembly 100 is coupled with right hand drive side crank arm 15a, a lock ring is used to fixedly couple the front sprocket assembly 100 onto right hand drive side crank arm 15a.

Spindle 12 is inserted through bicycle frame portion 11 and spindle interface 13 couples with the interface on right hand drive side crank assembly 36. In one embodiment, crank assembly 10 includes additional parts such as, pedals, pedal washers, preloader, dust caps, spindle spacers, bearings, hex nuts, preload adjusters, and the like. Those parts are not shown for purposes of clarity.

With reference now to FIG. 2, a diagram of a front sprocket assembly 100 is shown in accordance with an embodiment. Front sprocket assembly 100 includes an outer assembly 102 having a plurality of teeth 104 about an outer perimeter. In one embodiment, outer assembly 102 has 32 teeth. Although 32 teeth are shown in one embodiment, the technology is well suited to the use of various other numbers of teeth 104 such as 28, 30, 34, or the like. In one embodiment, outer assembly 102 is comprised of a first material. In one embodiment, the first material is a metallic component, e.g., aluminum, titanium, steel, or the like.

Front sprocket assembly 100 further includes a center assembly 106. In one embodiment, center assembly 106 is comprised of a different material than that of outer assembly 102. In one embodiment, center assembly 106 is formed by injection molding of carbon fiber reinforced nylon. In another embodiment, center assembly 106 is formed via compression molding. In yet another embodiment, center assembly 106 is formed via composite layering. In one embodiment, the material for center assembly 106 is nylon reinforced with carbon fibers. In other embodiments, the material for injection molded center assembly 106 is chopped carbon fibers. In yet another embodiment, center assembly 106 may be a plastic, polymer, other long fiber-reinforced plastics, or the like.

In one embodiment, center assembly 106 is formed with an optional crank arm fitting area 112. In general, crank arm fitting area 112 is an indentation formed in center assembly 106 within which right hand drive side crank arm 15a will fit.

Center assembly 106 has an opening 109 in the center thereof. Opening 109 is provided for coupling front sprocket assembly 100 with right hand drive side crank arm 15a via front sprocket assembly interface 17. Opening 109 further allows the insertion of spindle 12 there through such that spindle interface 13 can be coupled with right hand drive side crank assembly 36.

In one embodiment, the first material forming outer assembly 102 is selected to have a modulus of elasticity which is higher than the modulus of elasticity of the second material which forms center assembly 106. In one embodiment, the first material is aluminum, titanium, steel, or another metal; and the second material is a composite material such as, for example, carbon fiber reinforced plastic material, plastic, polymer, fiberglass, or the like.

In one embodiment, front sprocket assembly 100 includes optional crank drive ring 108. In one embodiment, crank drive ring 108 is coupled to center assembly 106 such that crank drive ring 108 is disposed approximately about a center of outer assembly 102 surrounding opening 109.

In one embodiment, crank drive ring 108 is used to transfer the load during high pressure situations, and to stop brinelling that may occur in the composite material of center assembly 106 along the spline interface and marring about opening 109. In one embodiment, the crank drive ring 108 is made of the same material as outer assembly 102. In another embodiment, the crank drive ring 108 is made of a different material such as titanium, steel, or other metal or composite. In one embodiment, crank drive ring 108 is ceramic. For example, a ceramic co-mold may be used to mold a ceramic crank drive ring 108 within the injection mold process.

Figure 3:
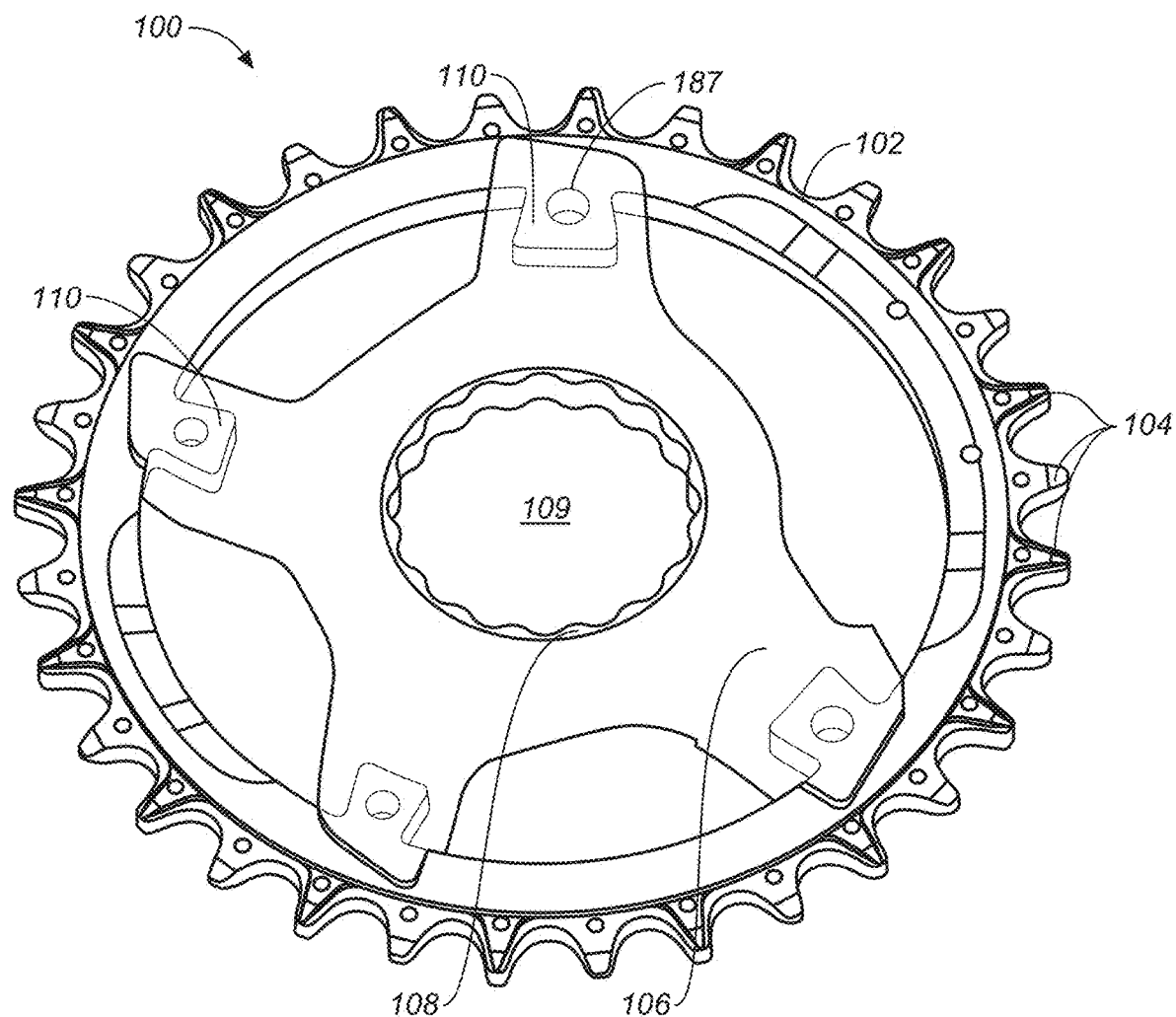
FIG. 3 is a transparent diagram of the bicycle front sprocket assembly, in accordance with an embodiment.

Referring now to FIG. 3, a transparent diagram of front sprocket assembly 100 is shown in accordance with an embodiment. In FIG. 3, tabs 110 are formed during the formation of outer assembly 102 and are inwardly projecting from outer assembly 102.

As shown in FIG. 3, in one embodiment, center assembly 106 is coupled to outer assembly 102 utilizing tabs 110 of outer assembly 102 such that center assembly 106 is formed about tabs 110 of outer assembly 102. In one embodiment, tabs 110 are tapered such that they are narrower at the base of outer assembly 102 and wider at the furthest point from outer assembly 102. As such, the center assembly 106 will lock about the tabs 110 of outer assembly 102 and resist having outer assembly 102 from being pulled out of the center assembly 106.

In one embodiment, one or more tabs 110 will include an optional hole 187. In general, optional hole 187 is at least one opening through tabs 110 that are utilized during the molding process to provide additional security in the contact between outer assembly 102 and center assembly 106. By having the center assembly 106 flow around tabs 110 and through hole 187 during the formation of front sprocket assembly 100; the final front sprocket assembly will have additional contact areas and interlocking aspects to further keep center assembly 106 properly oriented and fixedly and irremovably coupled with outer assembly 102. Moreover, due to the center assembly 106 being formed about outer assembly 102, the components will be irremovably coupled without any need for an external fastening device such as, but are not limited to: screws, bolts, clips, rivets, and the like.

Although four tabs 110 and four spokes for center assembly 106 are shown, the use of four spokes and tabs is an industrial design concept. It should be appreciated that center assembly 106 may have any number of spokes and that outer assembly 102 may have any number of tabs 110. For example, in another embodiment, composite center assembly 106 is irremovably coupled with two or more of the plurality of tabs 110 on the inner perimeter of outer assembly 102. Further, the number of spokes for center assembly 106 and tabs 110 of outer assembly 102 may not always be the same. For example, outer assembly 102 could have 6 tabs 110 and center assembly would only have four spokes and thus only utilize four of the tabs 110.

In one embodiment, because of the injection molding process, the spokes of center assembly 106 will overlap with the tabs 110 of outer assembly 102 but will not connect with each other. By not having the center assembly 106 wrapping around the entire inner circumference of outer assembly 102 (e.g., a circular perimeter), knit lines can be avoided during the injection molding process.

However, in another embodiment, center assembly 106 may be manufactured via composite layering or the like which would allow center assembly 106 to have a continuous perimeter about outer assembly 102 without the concern of knit line formation.

Figure 4C:
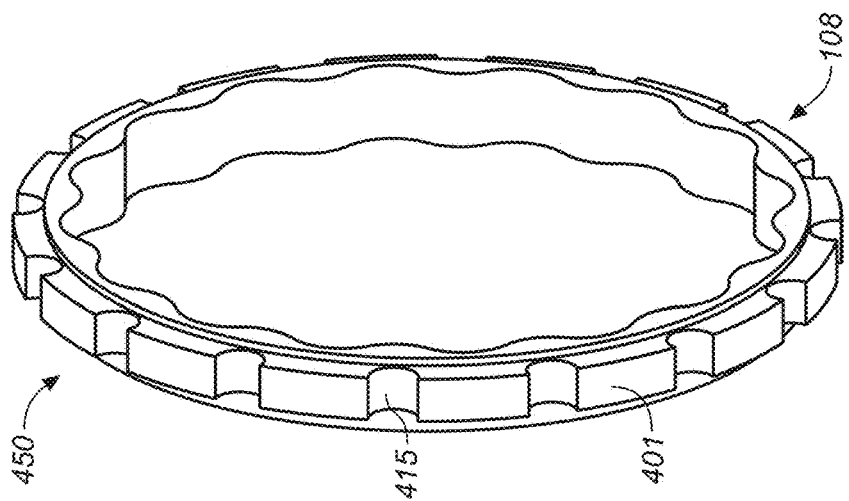
FIGS. 4A, 4B and 4C are different views of the crank drive ring, in accordance with an embodiment.
Figure 4B:
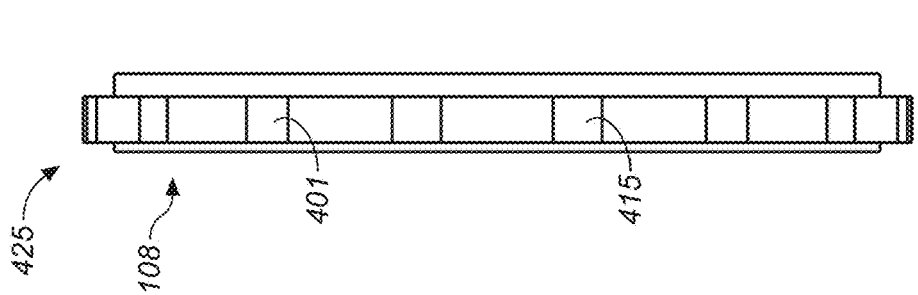
Figure 4A:
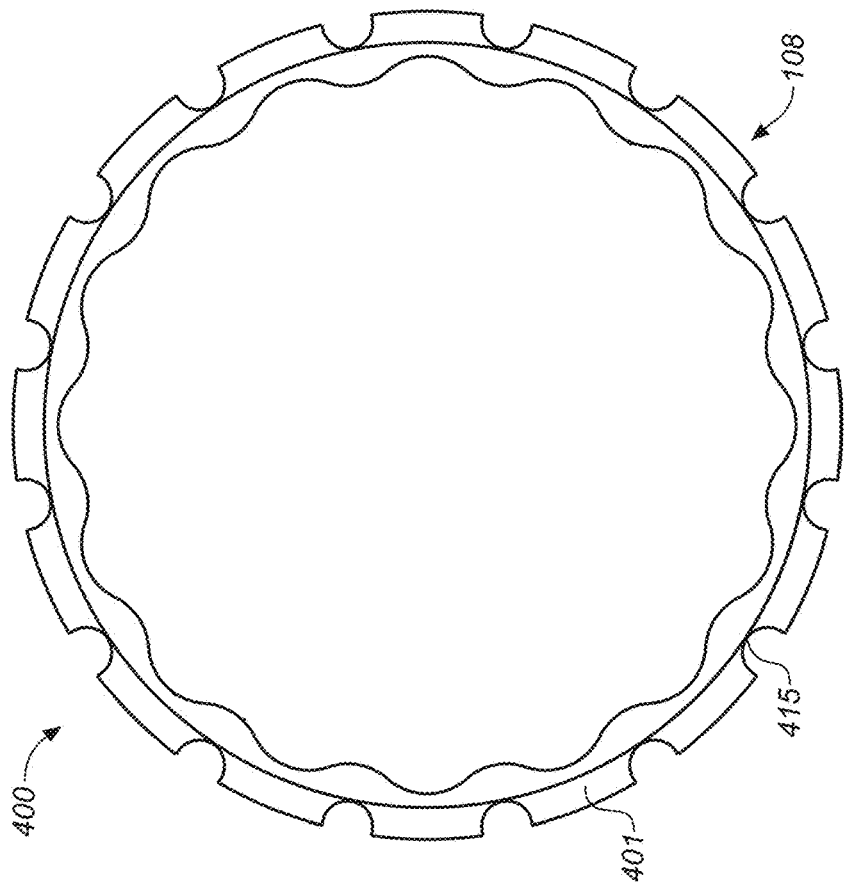

With reference now to FIGS. 4A, 4B and C, three different views of crank drive ring 108 are shown in accordance with one embodiment. FIG. 4A is a front view 400, FIG. 4B is a side view 425 and FIG. 4C is a isometric view 450.

The inner diameter of crank drive ring 108 includes a geometry that corresponds to the shape of front sprocket assembly interface 17. The outer diameter of crank drive ring 108 has an array of block features 401 that are surrounded by partial holes 415 which are slightly over-center to create a tapered shape on the block features 401 that acts similar to a shrink fit for locking the crank drive ring 108 into the composite center assembly 106.

In one embodiment, crank drive ring 108 is made from aluminum (or other metal). During the manufacturing process, center assembly 106 is molded about the tapered shaped block features 401 of crank drive ring 108 (and similarly the tapered shaped block features of tabs 110 of outer assembly 102). When the carbon fiber and aluminum are molded together at temperate, there is a difference between the thermal expansion of aluminum (or other metal making up crank drive ring 108) versus the thermal expansion of carbon fiber (or other material making up center assembly 106). Since the aluminum (or other metal) has a higher thermal expansion, during the cooling process the aluminum contracts more than the carbon fiber. As such, the block features 401 that are surrounded by partial holes 415 will shrink more than the carbon fiber center assembly which will further fixedly and irremovably couple the aluminum crank drive ring 108 with the carbon fiber center assembly 106 without an external fastening device being needed. Examples of an external fastening device include, but are not limited to: screws, bolts, clips, rivets, and the like.

Figure 5B:
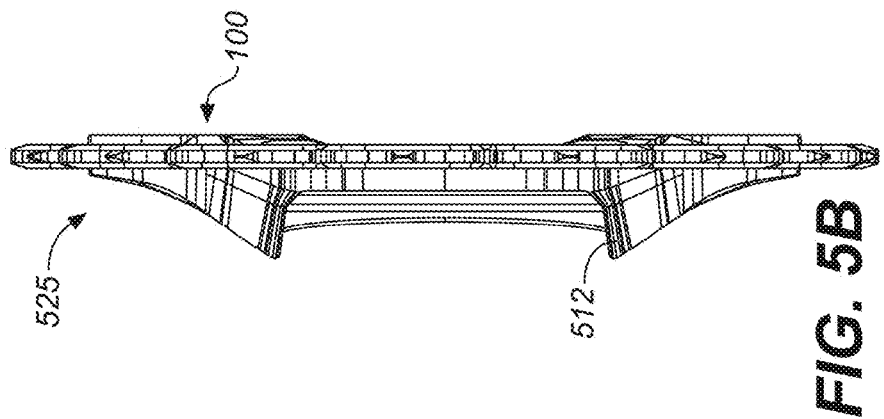
FIGS. 5A, 5B and 5C are different views of the composite bicycle front sprocket assembly, in accordance with an embodiment.
Figure 5A:
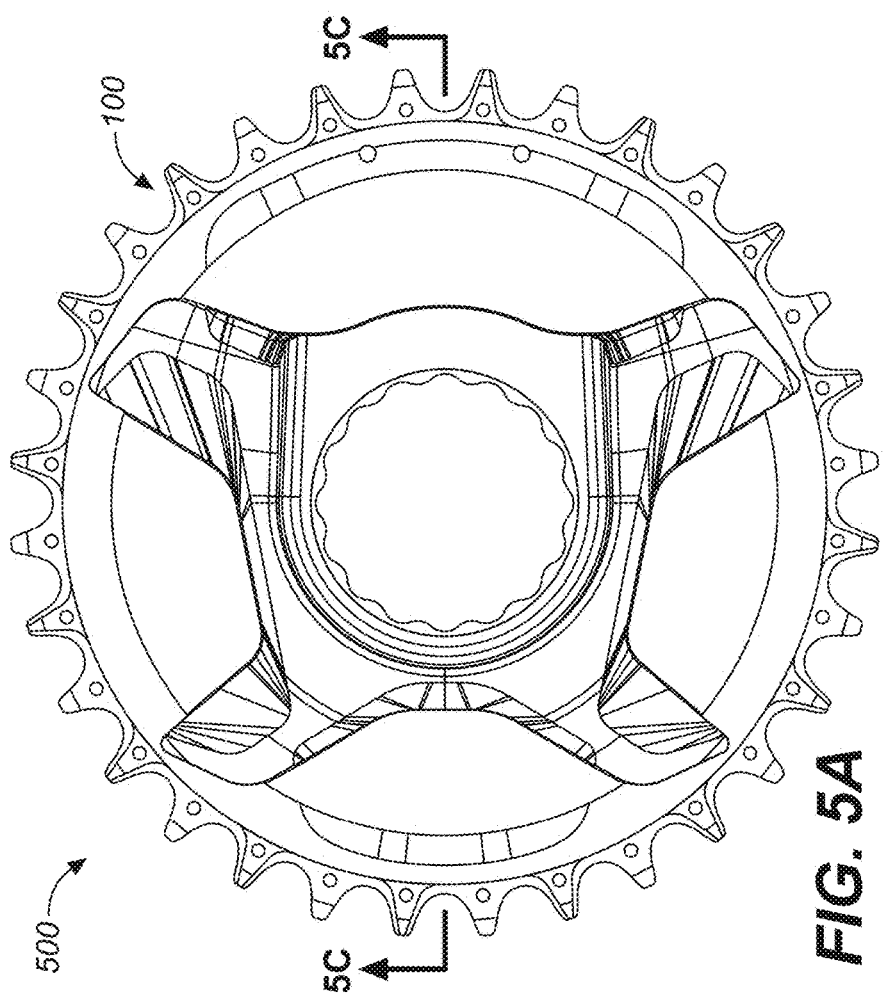
Figure 5C:
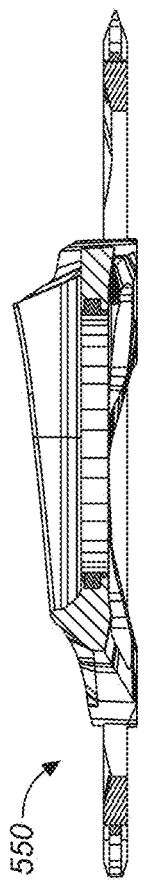

With reference now to FIGS. 5A, 5B and 5C, three different views of the front sprocket assembly 100 are shown in accordance with an embodiment. FIG. 5A is a front view 500, FIG. 5B is a side view 525 and FIG. 5C is a cross sectional view 550. FIG. 5A front view 500 is similar to that of FIG. 2 and is utilized to illustrate the cross section FIG. 5B and a possible diameter of opening 109.

FIG. 5B side view 525 is provided to illustrate the different topography 512 that is available to front sprocket assembly 100. In one embodiment, the topography 512 of front sprocket assembly 100 is not flat, but is of different thicknesses. In one embodiment, the different thickness increases the lateral stiffness of front sprocket assembly 100 as compared to a pressed or flat front sprocket assembly design.

In a bicycle, such as a mountain bike that has a lot of gears in the rear, there can be a significant amount of cross-chaining. That is, when the chain moves to the outside gears on the rear, there can be an increasing component of lateral pull on the composite front sprocket assembly 100. In one embodiment, the increase in lateral stiffness due to the varying topography 512 of composite front sprocket assembly 100 will provide additional support against the lateral pull on the front sprocket assembly 100 that is encountered due to the angle of the chain as different gears are selected.

FIG. 5C cross sectional view 550 provides a look at the different components of front sprocket assembly 100 as they are formed into an irremovably coupled front sprocket assembly 100.

Referring now to FIGS. 6A, 6B, 6C, 6D, 6E, and 6E, are different views of outer assembly 102 is shown in accordance with an embodiment. The views include FIG. 6A front view 600, FIG. 6B front view 605, FIG. 6C side view 625, FIGS. 6D and 6E sectional views 650, and FIG. 6F detail drawing 675.

Figure 6B:
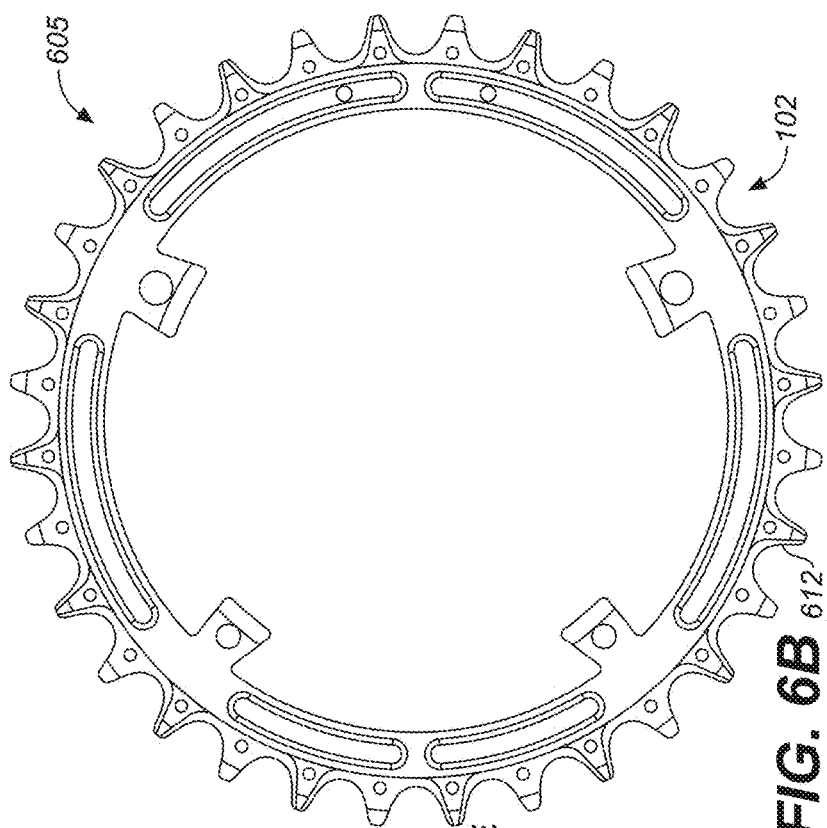
FIGS. 6A, 6B, 6C, 6D, 6E and 6F are different views of the outer assembly, in accordance with an embodiment.
Figure 6F:
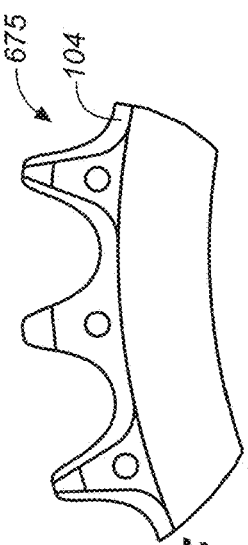
Figure 6A:
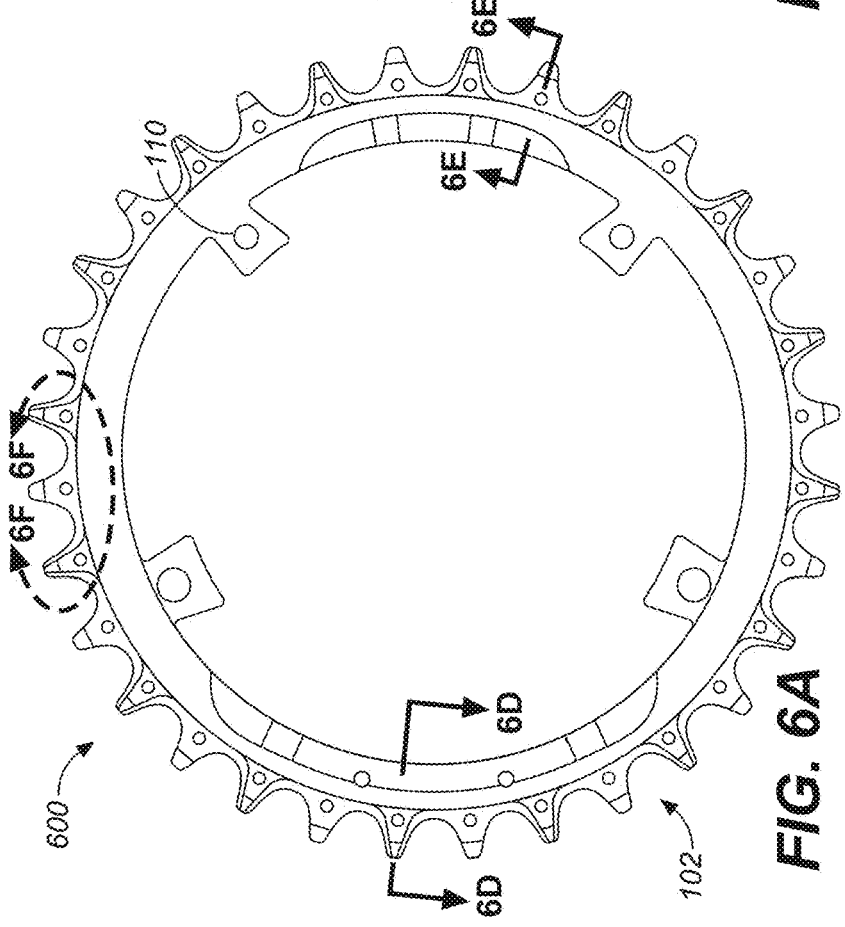

In one embodiment, FIG. 6A front view 600 shows the taper aspects of the plurality of tabs 110 as they grow wider from the inner perimeter of outer assembly 102 toward the center thereof. That is, FIG. 6A front view 600 illustrates the tapered shape of tab 110 to include a narrower length at a first portion (e.g., the base of tab 110) connected with the inner perimeter of outer assembly 102 and a wider length at a second portion (e.g., the tip of tab 110) furthest from the inner perimeter of outer assembly 102.

Figure 6C:
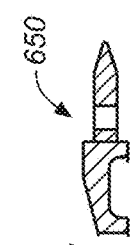
Figure 6E:
Figure 6D:
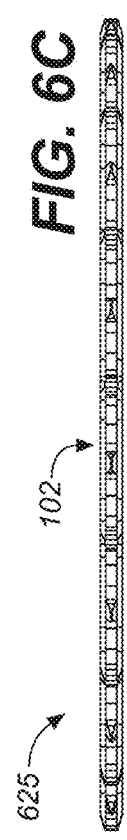

FIG. 6B front view 605 illustrates a number of weight saving holes 612 that are within outer assembly 102. FIG. 6C side view 625 illustrates the flatness and the thickness, of one embodiment, of outer assembly 102. FIGS. 6D and 6E section views 650 also illustrate a number of design differences about outer assembly 102 which may be used for weight savings, structural rigidity, and the like. FIG. 6F detail drawing 675 illustrates one embodiment of the possible geometry, including height, width, chain well, and the like, for the teeth 104 of outer assembly 102.

Figure 7:
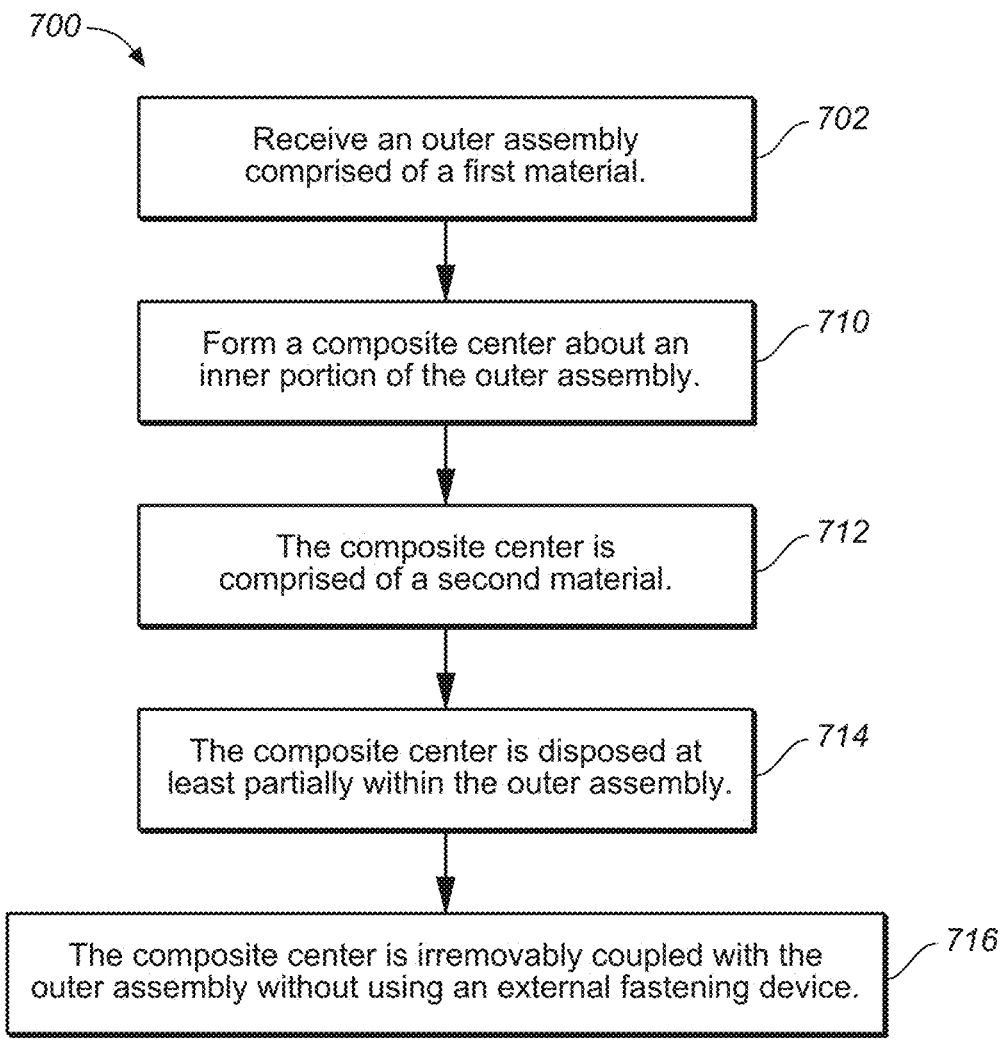
FIG. 7 is a flowchart of a method for manufacturing the bicycle front sprocket assembly, in accordance with an embodiment.

Referring now to FIG. 7, a flowchart 700 of a method for manufacturing the front sprocket assembly 100 is shown in accordance with an embodiment.

With reference now to 702 of FIG. 7 and FIG. 6, one embodiment receives an outer assembly 102 comprised of a first material. In one embodiment, the first material is aluminum. However, in another embodiment, the first material may be another metal such as, titanium, steel, nickel, or the like.

With reference now to 710 of FIG. 7 and FIGS. 2 and 3, one embodiment forms a composite center assembly 106 about an inner portion of the outer assembly 102. In one embodiment, center assembly 106 is formed by injection molding of carbon fiber reinforced nylon. In another embodiment, center assembly 106 is formed via compression molding. In yet another embodiment, center assembly 106 is formed via composite layering.

With reference now to 712 of FIG. 7 and FIGS. 2 and 3, in one embodiment the composite center is comprised of a second material. In one embodiment, the material for center assembly 106 is a chopped carbon fiber reinforced with nylon. In other embodiments, the material for injection molded center assembly 106 is chopped carbon fibers. In yet another embodiment, center assembly 106 may be a plastic, polymer, or the like. Although a number of specific measurements are referred to, in one embodiment, the length of the chopped carbon fibers may be longer or shorter than 7 mm.

With reference now to 714 of FIG. 7 and FIGS. 2 and 3, in one embodiment the composite center assembly 106 is disposed at least partially within the outer assembly 102.

With reference now to 716 of FIG. 7 and FIGS. 2 and 3, in one embodiment the composite center is irremovably coupled with the outer assembly without using an external fastening device. For example, as described herein, center assembly 106 may be manufactured via composite layering or the like which would allow center assembly 106 to be irremovably coupled with and have a continuous perimeter about outer assembly 102 without the concern of knit line formation.

In another embodiment, center assembly 106 includes a plurality of tabs 110 on the inner perimeter and center assembly 106 is irremovably coupled to outer assembly 102 utilizing tabs 110 of outer assembly 102 such that center assembly 106 is formed about tabs 110 of outer assembly 102, e.g., via injection molding, pressure molding, or the like. In one embodiment, tabs 110 are tapered such that they are narrower at the base of outer assembly 102 and wider at the furthest point from outer assembly 102. As such, the center assembly 106 will lock about the tabs 110 of outer assembly 102 and resist having outer assembly 102 from being pulled out of the center assembly 106.

Figure 8:
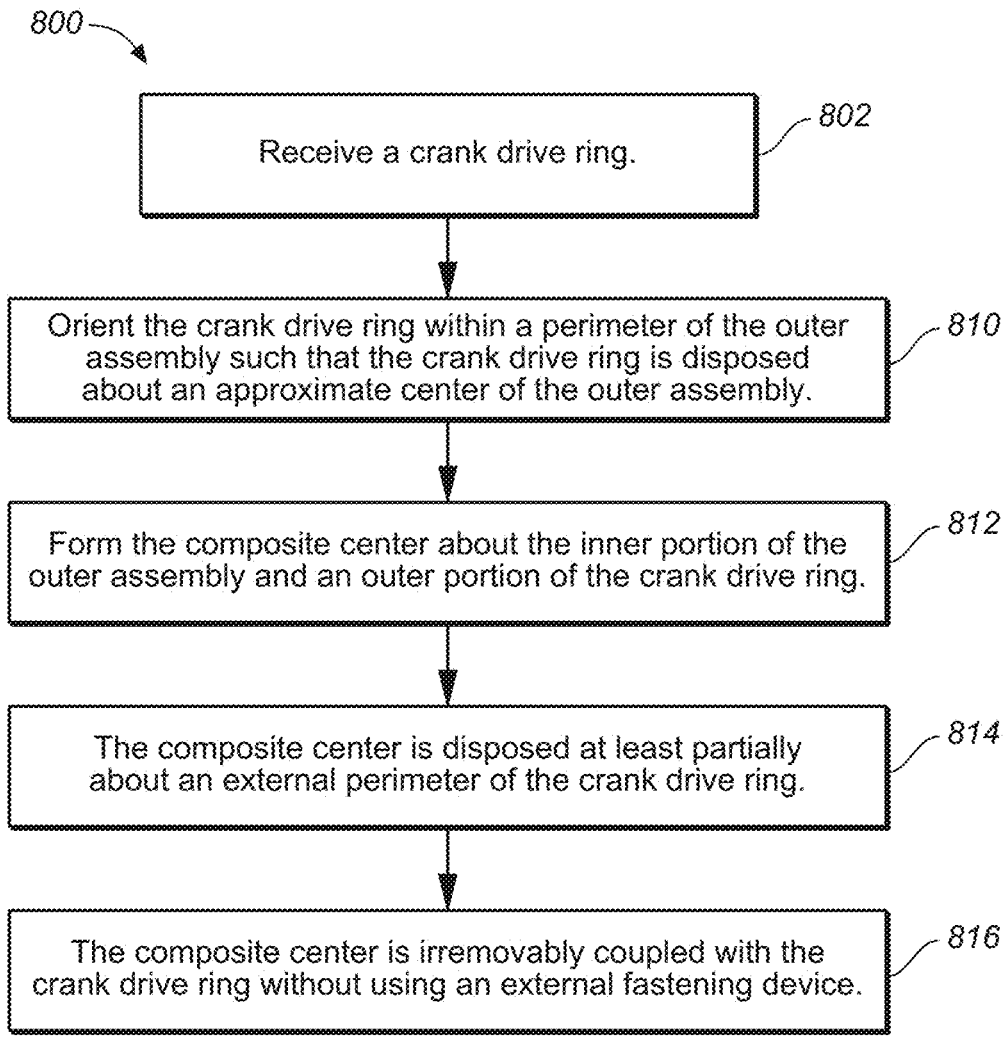
FIG. 8 is a flowchart of a method for manufacturing the bicycle front sprocket assembly that includes a crank drive ring, in accordance with an embodiment.

With reference now to FIG. 8, a flowchart 800 of a method for manufacturing the front sprocket assembly 100 that includes crank drive ring 108 is shown in accordance with an embodiment. The portions of flowchart 800 are utilized in addition to those previously described in flowchart 700 such that an additional component, crank drive ring 108, is also irremovably coupled into the composite front sprocket assembly 100 during the formation thereof.

Referring now to 802 of FIG. 8 and also FIGS. 1 and 4, one embodiment receives the optional crank drive ring 108. In one embodiment, the inner diameter of crank drive ring 108 includes a geometry that corresponds to the shape of front sprocket assembly interface 17. The outer diameter of crank drive ring 108 has an array of block features 401 that are surrounded by partial holes 415 which are slightly over-center As described herein, crank drive ring 108 is used to transfer the load during high pressure situations, and to stop brinelling that may occur in the composite material of center assembly 106 along the spline interface and marring about opening 109. In one embodiment, the crank drive ring 108 is made of the same material as outer assembly 102. In another embodiment, the crank drive ring 108 is made of a different material such as titanium, steel, or other metal or composite. In one embodiment, crank drive ring 108 is ceramic. For example, a ceramic co-mold may be used to mold a ceramic crank drive ring 108 within the injection mold process that forms composite front sprocket assembly 100.

With reference now to 810 of FIG. 8 and also FIGS. 2 and 3, one embodiment orients the crank drive ring 108 within a perimeter of the outer assembly 102 such that the crank drive ring 108 is disposed about an approximate center of the outer assembly 102.

Referring now to 812 of FIG. 8 and also FIGS. 2 and 3, one embodiment forms the composite center assembly 106 about the inner portion of the outer assembly 102 and an outer portion of the crank drive ring 108. In one embodiment, center assembly 106 is formed by injection molding of carbon fiber reinforced nylon. In another embodiment, center assembly 106 is formed via compression molding. In yet another embodiment, center assembly 106 is formed via composite layering.

Referring now to 814 of FIG. 8 and also FIGS. 2 and 3, in one embodiment the composite center assembly 106 is disposed at least partially about an external perimeter of the crank drive ring 108.

With reference now to 816 of FIG. 8 and also FIGS. 2 and 3, in one embodiment the composite center is irremovably coupled with the crank drive ring without using an external fastening device. As described herein, in one embodiment, the outer diameter of crank drive ring 108 has an array of block features 401 that are surrounded by partial holes 415 which are slightly over-center to create a tapered shape on the block features 401 that acts similar to a shrink fit for locking the crank drive ring 108 into the composite center assembly 106.

Thus, embodiment of the front sprocket assembly 100 described herein achieve a more integrated aesthetic with carbon crank arms. Additionally, embodiments create a front sprocket assembly 100 which is lighter than all-aluminum front sprockets. For example, in one embodiment, the target weight of front sprocket assembly is 60 grams. Moreover, the front sprocket assembly 100 is able to achieve the above accomplishments while still meeting or exceeding conventional strength and stiffness criteria for front sprockets. E.g., the fatigue life requirements dictated by JIS D 9415-1993, part 4 (5); EN 14766:2005: E, part 4.13.7.X; and ISO 4210-8:2014, Part 4.4.1. Also, the front sprocket assembly 100 can be built with a lower cost than is found in many conventional front sprockets.

The foregoing Description of Embodiments is not intended to be exhaustive or to limit the embodiments to the precise form described. Instead, example embodiments in this Description of Embodiments have been presented in order to enable persons of skill in the art to make and use embodiments of the described subject matter. Moreover, various embodiments have been described in various combinations. However, any two or more embodiments could be combined. Although some embodiments have been described in a language specific to structural features and/or methodological acts, it is to be understood that the subject matter defined in the appended claims is not necessarily limited to the specific features or acts described above. Rather, the specific features and acts described above are disclosed by way of illustration and as example forms of implementing the claims and their equivalents.

What is claimed is:

1. A bicycle front sprocket assembly comprising:
an outer assembly comprising a first material; and
a center assembly comprising a second material,
said center assembly disposed at least partially within said outer assembly,
said center assembly irremovably coupled with said outer assembly, and
said center assembly irremovably coupled with said outer assembly without an external fastening device to irremovably couple said center assembly with said outer assembly; and
a central opening disposed approximately about a center of said center assembly, said central opening defined by a circumference which is configured to couple with a sprocket interface of a drive side crank arm.

2. The composite bicycle front sprocket of claim 1, wherein said outer assembly is aluminum.

3. The composite bicycle front sprocket of claim 1, wherein said center assembly is a composite material.

4. The composite bicycle front sprocket of claim 1, wherein said center assembly is carbon fiber reinforced plastic.

5. The bicycle front sprocket assembly of claim 1, wherein said outer assembly comprises:
a plurality of teeth on an outer perimeter of said outer assembly; and
a plurality of tabs on an inner perimeter of said outer assembly.

6. The bicycle front sprocket assembly of claim 5, wherein at least one tab of said plurality of tabs comprises:
a tapered shape, the tapered shape comprising:
a narrower length at a first portion connected with the inner perimeter of said outer assembly; and
a wider length at a second portion furthest from the inner perimeter of said outer assembly.

7. The bicycle front sprocket assembly of claim 5, wherein said center assembly is irremovably coupled with said plurality of tabs of said outer assembly.

8. The bicycle front sprocket assembly of claim 5, wherein said center assembly is about and encases said plurality of tabs of said outer assembly, the center assembly being irremovably coupled with said plurality of tabs of said outer assembly.

* * * * *